United States Patent
Tornqvist

(10) Patent No.: US 9,130,841 B2
(45) Date of Patent: Sep. 8, 2015

(54) METHOD AND A DEVICE FOR UPDATING CONFIGURATION DATA FOR PROVIDING NETWORK ELEMENT PROTECTION IN A DATA TRANSFER NETWORK

(75) Inventor: Kristian Tornqvist, Vantaa (FI)

(73) Assignee: CORIANT OY, Espoo (FI)

( * ) Notice: Subject to any disclaimer, the term of this patent is extended or adjusted under 35 U.S.C. 154(b) by 647 days.

(21) Appl. No.: 13/198,121

(22) Filed: Aug. 4, 2011

(65) Prior Publication Data
US 2012/0054537 A1    Mar. 1, 2012

(30) Foreign Application Priority Data
Aug. 24, 2010 (FI) ...................................... 20105878

(51) Int. Cl.
| | |
|---|---|
| G06F 11/20 | (2006.01) |
| H04L 12/24 | (2006.01) |
| H04L 12/703 | (2013.01) |
| H04L 12/26 | (2006.01) |

(52) U.S. Cl.
CPC ........ *H04L 41/0846* (2013.01); *G06F 11/2097* (2013.01); *H04L 41/0663* (2013.01); *H04L 45/28* (2013.01); *H04L 43/0811* (2013.01)

(58) Field of Classification Search
CPC ... G06F 11/20; G06F 11/202; G06F 11/2035; G06F 11/2038; G06F 11/2041; G06F 11/2097
USPC ................................................ 714/4.11, 4.12
See application file for complete search history.

(56) References Cited

U.S. PATENT DOCUMENTS

| | | | |
|---|---|---|---|
| 6,108,300 A * | 8/2000 | Coile et al. ..................... | 370/217 |
| 6,148,410 A * | 11/2000 | Baskey et al. ................ | 714/4.11 |
| 6,760,859 B1 * | 7/2004 | Kim et al. ..................... | 714/4.21 |
| 6,888,792 B2 * | 5/2005 | Gronke ......................... | 370/227 |

(Continued)

FOREIGN PATENT DOCUMENTS

| | | |
|---|---|---|
| CN | 1610898 | 4/2005 |
| CN | 1946058 | 4/2007 |

(Continued)

OTHER PUBLICATIONS

Wikipedia's Multiprotocol Label Switching http://en.wikipedia.org/w/index.php?title=Multiprotocol_Label_Switching&oldid=379221341 version from Aug. 16, 2010.*

(Continued)

*Primary Examiner* — Joseph Schell
(74) *Attorney, Agent, or Firm* — Young & Thompson

(57) ABSTRACT

A system for providing network element protection includes a backup network element (101) having a first configuration table storing first configuration data, an active network element (102) having a second configuration table storing second configuration data, and a controller (117) arranged to update the first configuration data according to changes of the second configuration data. The controller is arranged to carry out the updating when the active network element operates according to the second configuration data as a part of a data transfer network (100). Hence, the configuration data of the backup network element is maintained and managed as if backup network element were actively in use. Therefore, the switchover from the active network element to the backup network element can be quick and resilient in a case of a failure in the active network element or in a data transfer connection to or from the active network element.

22 Claims, 3 Drawing Sheets

(56) References Cited

U.S. PATENT DOCUMENTS

| | | | |
|---|---|---|---|
| 7,275,175 B2* | 9/2007 | Cardona et al. | 714/4.11 |
| 7,394,832 B1 | 7/2008 | Dykstra | |
| 7,441,141 B2* | 10/2008 | Poustchi et al. | 714/4.11 |
| 7,490,161 B2 | 2/2009 | Ren | |
| 2002/0169794 A1 | 11/2002 | Jones et al. | |
| 2002/0197004 A1 | 12/2002 | Feinberg et al. | |
| 2003/0056138 A1 | 3/2003 | Ren | |
| 2006/0020854 A1 | 1/2006 | Cardona et al. | |
| 2006/0159011 A1 | 7/2006 | Dalal et al. | |
| 2006/0193247 A1 | 8/2006 | Naseh et al. | |
| 2007/0263532 A1 | 11/2007 | Mirtorabi et al. | |
| 2008/0091746 A1* | 4/2008 | Hatasaki et al. | 707/204 |
| 2008/0281955 A1 | 11/2008 | Laghi et al. | |
| 2010/0250717 A1* | 9/2010 | Akagi | 709/221 |

FOREIGN PATENT DOCUMENTS

| | | |
|---|---|---|
| EP | 1 677 468 A1 | 7/2006 |
| EP | 1 703 399 A1 | 9/2006 |
| WO | 2005039129 A1 | 3/2003 |

OTHER PUBLICATIONS

European Search Report, date Oct. 18, 2011, in Application No. EP 11176782.

Finnish Search Report, dated May 5, 2011, from corresponding Finnish application.

Chinese Search Report, dated May 5, 2015, in corresponding Chinese Patent Application No. 201110251517.4.

* cited by examiner

METHOD AND A DEVICE FOR UPDATING CONFIGURATION DATA FOR PROVIDING NETWORK ELEMENT PROTECTION IN A DATA TRANSFER NETWORK

FIELD OF THE INVENTION

The invention relates to a method and to a system for providing network element protection in a data transfer network. Furthermore, the invention relates to a device and to a computer program for providing network element protection in a data transfer network. Furthermore, the invention relates to a network element capable of protecting another network element.

BACKGROUND

Data transfer networks include network elements such as, for example, routers, switches, and terminal devices which communicate with each other via data transfer links between the network elements. In order to provide a sufficient quality of service, data transfer networks should be able to operate also in situations in which a failure takes place in a network element or in data transfer links to or from the network element. For achieving secure and reliable operation, important active network elements of data transfer networks are secured with respective backup network elements. The backup network element is activated to perform at least part of the tasks of the respective active network element as a consequence of an event representing a deliberate network management order or a failure in the active network element and/or in data transfer links to or from the active network element. Therefore, this arrangement provides protection against failures in the active network element and in data transfer links to or from the active network element. Traditionally, the backup network element is configured to operate in the prevailing circumstances after an event which causes a need to activate the backup network element has already occurred. In a case of a failure event, this traditional way provides, however, only a slow traffic restoration.

Publication US2007263532 discloses an arrangement where a SONET (Synchronous Optical NETwork) terminated by routers includes working data transfer paths and backup data transfer paths. The routers pre-configure into their link state data bases the links of both the working and backup data transfer paths. However, the links involved in the backup data transfer paths are given higher costs. Thus, in normal circumstances, the routers select only the links of the working data transfer path. If there is a failure in a link of a working data transfer path, the arrangement provides a switchover to activate the corresponding backup data transfer path. This is accomplished by changing the relative costs of the working and backup links involved, so that the routers select the backup links for their routing tables. This arrangement is designed for protecting a data transfer path from a first router to a second router with a backup data transfer path that is also from the first router to the second router. This arrangement is not, however, at least directly suitable for protecting the above-mentioned first router or the second router. This arrangement does not work at all if one of the first and second routers gets out of the service due to e.g. problems in the electric power supply or some other reason. Furthermore, this arrangement is based on the traditional principle that configuration is changed only after a failure has already taken place, i.e. the changing of the relative costs of the working and backup links is accomplished only after the failure has taken place. In many situations, this traditional principle provides only a slow traffic restoration.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new system for providing network element protection. The system comprises:

a first network element comprising a first configuration table storing first configuration data, a second network comprising a second configuration table storing second configuration data, and a controller arranged to update the first configuration data according to changes of the second configuration data, wherein the controller is arranged to carry out the updating as a response to a situation in which the second network element operates according to the second configuration data as a part of a data transfer network and the first network element constitutes a backup network element for the second network element, so as to keep the first network element capable of replacing the second network element in the data transfer network.

In the system described above, the configuration table of the backup network element, i.e. the first network element, is maintained to be up-to-date with respect to the configuration table of the active network element, i.e. the second network element. When data for the active network element, e.g. circuit data, routing information etc, is input to the configuration table of the active network element, the configuration table of the backup network element is updated accordingly. Hence, the backup network element is ready for use because its configuration data is maintained and managed as if the backup network element were actively in use. Therefore, the switchover from the active network element to the backup network element is more quick and resilient than in a case where the switchover is carried out in the traditional manner so that the backup network element is configured to operate in the prevailing circumstances only after an event which causes a need to activate the backup network element has already occurred.

In accordance with the second aspect of the invention there is provided a new method for controlling a first network element of a data transfer network to protect a second network element of the data transfer network, wherein the first network element comprises a first configuration table storing first configuration data and the second network element comprises a second configuration table storing second configuration data. The method according to the second aspect of the invention comprises updating the first configuration data according to changes of the second configuration data when the second network element operates according to the second configuration data as a part of the data transfer network and the first network element constitutes a backup network element for the second network element, so as to keep the first network element capable of replacing the second network element in the data transfer network.

In accordance with the third aspect of the invention there is provided a new device comprising a controller arranged to update first configuration data stored in a configuration table of a first network element according to changes of second configuration data stored in a configuration table of a second network element, wherein the controller is arranged to carry out the updating as a response to a situation in which the second network element operates according to the second configuration data as a part of a data transfer network and the first network element constitutes a backup network element for the second network element, so as to keep the first network element capable of replacing the second network element in the data transfer network.

The device can be, for example, a network management station, a network element such as a router, or a separate device connected to one or more of the above-mentioned.

In accordance with the fourth aspect of the invention there is provided a new network element for protecting another network element. The network element comprises:
- data transfer ports for connecting to data transfer links,
- a processing system for supporting a data transfer protocol,
- a configuration table for storing configuration data, and
- a device for updating the configuration data according to changes of configuration data of the other network element as a response to a situation in which the network element is a backup network element for the other network element and the other network element operates as a part of a data transfer network, so as to keep the network element capable of replacing the other network element in the data transfer network.

In accordance with the fifth aspect of the invention there is provided a new computer program for controlling a first network element of a data transfer network to protect a second network element of the data transfer network, the first network element comprising a first configuration table storing first configuration data and the second network element comprising a second configuration table storing second configuration data. The computer program comprises computer executable instructions for controlling a programmable processor to update the first configuration data according to changes of the second configuration data as a response to a situation in which the second network element operates according to the second configuration data as a part of the data transfer network and the first network element constitutes a backup network element for the second network element, so as to keep the first network element capable of replacing the second network element in the data transfer network.

In accordance with the sixth aspect of the invention there is provided a new computer program product. The computer program product comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
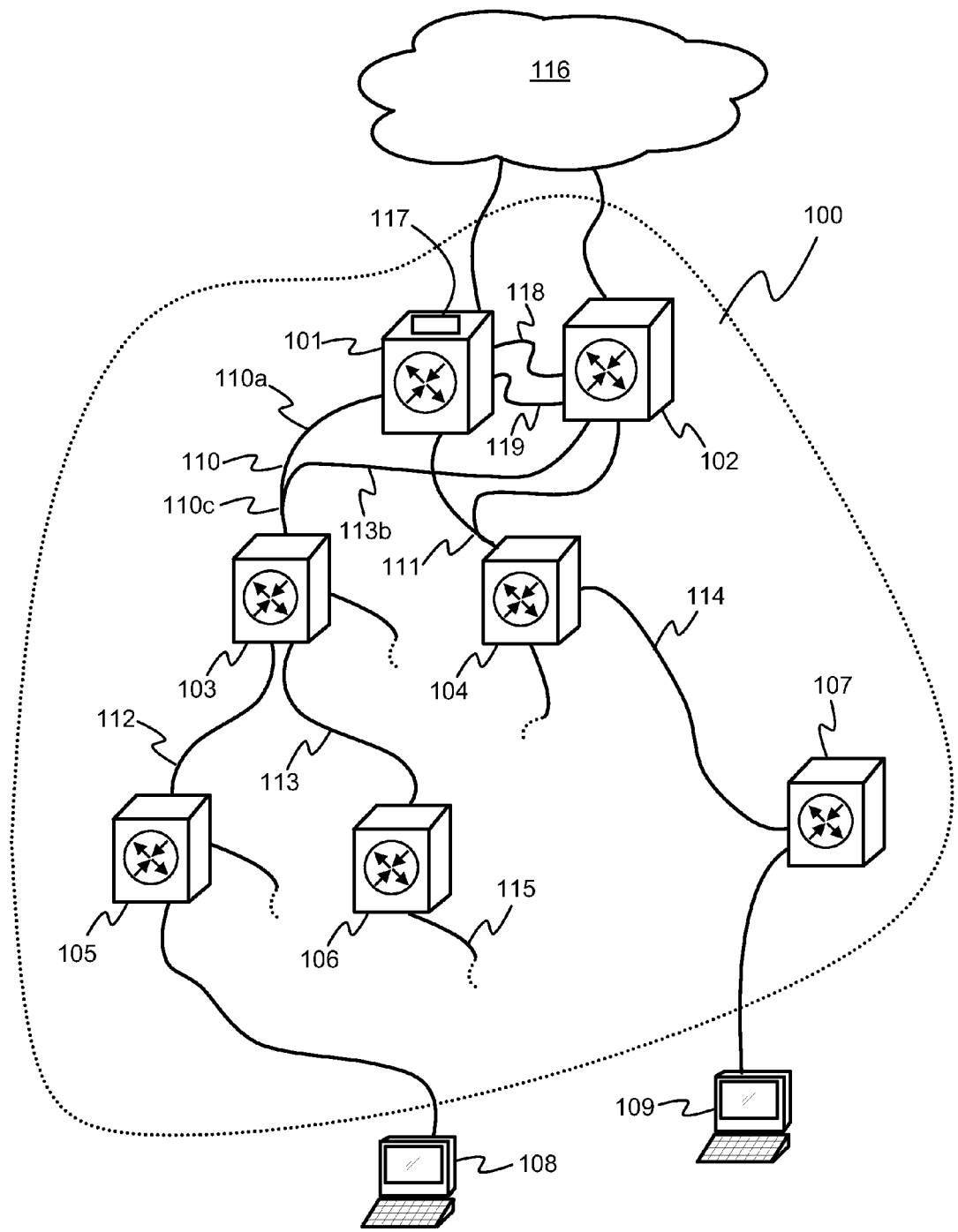
FIG. 1 shows a schematic illustration of a data transfer network comprising a system according to an embodiment of the invention for providing network element protection.

FIG. 1 shows a schematic illustration of a data transfer network 100 which comprises a system according to an embodiment of the invention for providing network element protection. The data transfer network can be, for example but not necessarily, a personal area network ("PAN"), a local area network ("LAN"), a metropolitan area network ("MAN"), a wide area network ("WAN"), a combination of two or more of the above-mentioned, or a part of any of the above-mentioned. In the exemplifying case shown in FIG. 1, the data transfer network comprises network devices 101, 102, 103, 104, 105, 106, and 107 which are interconnected with data transfer links 110, 111, 112, 113, and 114. The data transfer network 100 is connected to an external data transfer system 116 that can be, for example, the Internet. The network devices 101-107 can be, for example but not necessarily, routers arranged to support the Internet Protocol. Furthermore, the network devices may be arranged to support, for example, the Multi Protocol Label Switching ("MPLS"). Terminal devices 108 and 109 can be connected to the data transfer network 100 as illustrated in FIG. 1. In addition to the network devices 101-107, the data transfer system may comprise network devices which are not shown in FIG. 1 and/or the data transfer system may be connected to terminal devices which are not shown in FIG. 1. This is illustrated in FIG. 1 with data transfer links drawn to continue as a dashed-line such as a data transfer link 115.

In the exemplifying case shown in FIG. 1, the network element 102 that constitutes a gateway to the external data transfer system 116 is seen to be so important that it has been protected with the network element 101 that is also connected to the external data transfer system and constitutes a backup network element for the network element 102. The system for providing a protected network element functionality in the gateway between the data transfer network 100 and the external data transfer system 116 comprises the network element 101 including a first configuration table storing first configuration data, the network element 102 comprising a second configuration table storing second configuration data, and a controller 117 arranged to update the first configuration data according to changes of the second configuration data. The controller is arranged to carry out the updating when the network element 102 operates according to the second configuration data as a part of the data transfer network 100, i.e. as the gateway, and the network element constitutes 101 a backup network element for the network element 102. Thus, the configuration table of the backup network element, i.e. the network element 101, is maintained to be up-to-date with respect to the configuration table of the active network element, i.e. the network element 102. When data for the network element 102, e.g. circuit data, routing information etc, is input to the configuration table of the network element 102, the configuration table of the network element 101 is updated accordingly. Hence, the network element 101 is ready for use because its configuration data is maintained and managed as if the network element 101 were actively in use, i.e. the network element 101 is under the network management as if it were actively in use. Therefore, the switchover from the network element 102 to the network element 101 is more quick and resilient than in a case where the switchover is carried out in the traditional manner so that the network element 101 is configured to operate in the prevailing circumstances only after an event which causes a need to activate the network element 101 has already occurred. The switchover from the network element 102 to the network element 101 can be initiated, for example, manually via the network management. In this case, it is preferably first verified whether the network element 101 is up-to-date for taking the role of the network element 102 and, if yes, the switchover is carried out and an appropriate notice can be delivered to the network management. In a case the network element 101 is not up-to-date for taking the role of the network element 102 an alarm is delivered to the network management. The other alternative is that the switchover is initiated by a fault in the network element 102 and/or in a data transfer link connected to the network element 102. The occurrence of the fault can be detected, for example, by the network management. The network management can, for example, monitor the status of the data transfer network 100 and, if the above-mentioned fault occurs, perceive that the network element 102 and/or a data transfer connection to or from the network element 102 does not work properly any more. In this case, it is preferably first verified whether the network element 101 is up-to-date for taking the role of the network element 102 and, if yes, the switchover is carried out and an appropriate notice is delivered to the network management. If the network element 101 is not up-to-date for taking the role of the network element 102, an alarm is delivered to the network management.

It should be, however, noted that any of the network elements of the data transfer network 100 could be protected in the same manner as the network element 102 is protected with the backup network element 101. In more general terms, a system for providing network element protection, i.e. protected network element functionality, comprises a first network element including a first configuration table storing first configuration data, a second network element including a second configuration table storing second configuration data, and a controller arranged to update the first configuration data according to changes of the second configuration data when the second network element operates according to the second configuration data as a part of the data transfer network and the first network element constitutes a backup network element for the second network element, so as to keep the first network element capable of replacing the second network element in the data transfer network. In the exemplifying case shown in FIG. 1, the network element 101 is the above-mentioned first network element and the network element 102 is the above-mentioned second network element. Furthermore, it should be noted that the active network element 102 and the backup network element 101 do not have to be located in the same site but there can be e.g. tens of kilometers of distance between the network elements 101 and 102.

In the exemplifying case shown in FIG. 1, the controller 117 that keeps the configuration table of the network element 101 up-to-date with the configuration table of the network element 102 is a part of the network element 101. In this case, the controller can be arranged to send query messages to the network element 102 for requesting information about possible changes in the configuration table of the network element 102. It is also possible that the network element 102 is arranged to send to the network element 101 information about changes in the configuration table of the network element 102 automatically when the changes take place. The controller 117 could also be located in the network element 102, where it can be arranged to send update commands to the network element 101 when changes take place in the configuration table of the network element 102. The controller 117 could also be located in a separate device that is external to both of the network elements 101 and 102. The separate device can be e.g. a part of a network management system. The controller is typically not a separate physical device but the functionality of the controller 117 can be implemented with software using hardware of the network elements and/or the network management system. The controller 117 is preferably arranged to check and verify the consistency between the configuration table of the network element 101 and the configuration table of the network element 102 so as to ensure that the said configuration tables correspond to each other in all situations. The controller 117 can be arranged to carry out the checking and verifying for example periodically so that there is a predetermined time between successive checking and verifying actions.

In a system according to an embodiment of the invention, the controller 117 is arranged to write hardware specific data of the network element 102 to the configuration table of the network element 101. The network element 101 is arranged to emulate the network element 102 with the aid of the hardware specific data of the network element 102 in a situation in which the network element 101 has replaced the network element 102, i.e. a switchover from the network element 102 to the network element 101 has taken place. The hardware specific data of the network element 102 may contain, for example, one or more Medium Access Control ("MAC") addresses related to the network element 102. Thus, the network element 101 can behave in the data transfer network in such a manner that that the network element 101 looks like the network element 102 from the viewpoint of the other network elements communicating with the network element 101.

In a system according to an embodiment of the invention, the network element 101 is arranged to advertise, after replacing the network element 102, to network elements neighbouring the network element 101 in the data transfer network that the network element 101 has replaced the network element 102 in the data transfer network. Therefore, the neighbouring network elements e.g. network elements 103 and 104 know that they have to communicate with the network element 101 instead of the network element 102.

A system according to an embodiment of the invention comprises monitoring data links 118 and 119 between the network elements 101 and 102. The controller 117 can be arranged to activate the network element 101 as a response to a situation in which all of the one or more monitoring data links cease to work. The monitoring data links 118 and 119 can be used for transferring information about changes in the configuration table of the network element 102 to the network element 101. However, it also possible that the information about changes in the configuration table of the network element 102 is transferred using data transfer links 110 and 111 the main purpose of which is to transfer normal payload data.

In a system according to an embodiment of the invention, the data transfer link 110 is a branched data transfer link that is connected to the both network elements 101 and 102. The network element 101 is connected to a first branch 110a of the branched data transfer link 110, the network element 102 is connected to a second branch 110b of the branched data transfer link 110, and a third branch 110c of the branched data transfer link 110 is connected to the third network element 104 of the data transfer network. The branched data transfer link is arranged to transfer data transmitted from the network element 103 to the both network elements 101 and 102, data transmitted from the network element 101 to the network element 103, and data transmitted from the network element 102 to the network element 103. The branched data transfer link 110 can be implemented with copper wires or optical fibres and with a suitable branching element known by a skilled person. In the case shown in FIG. 1, also the network element 104 has been connected to the network elements 101 and 102 with a branched data transfer link 111. The use of the branched data transfer links as illustrated in FIG. 1 reduces a need to make changes in link connections before or after a switchover from the network element 102 to the network element 101.

Figure 2:
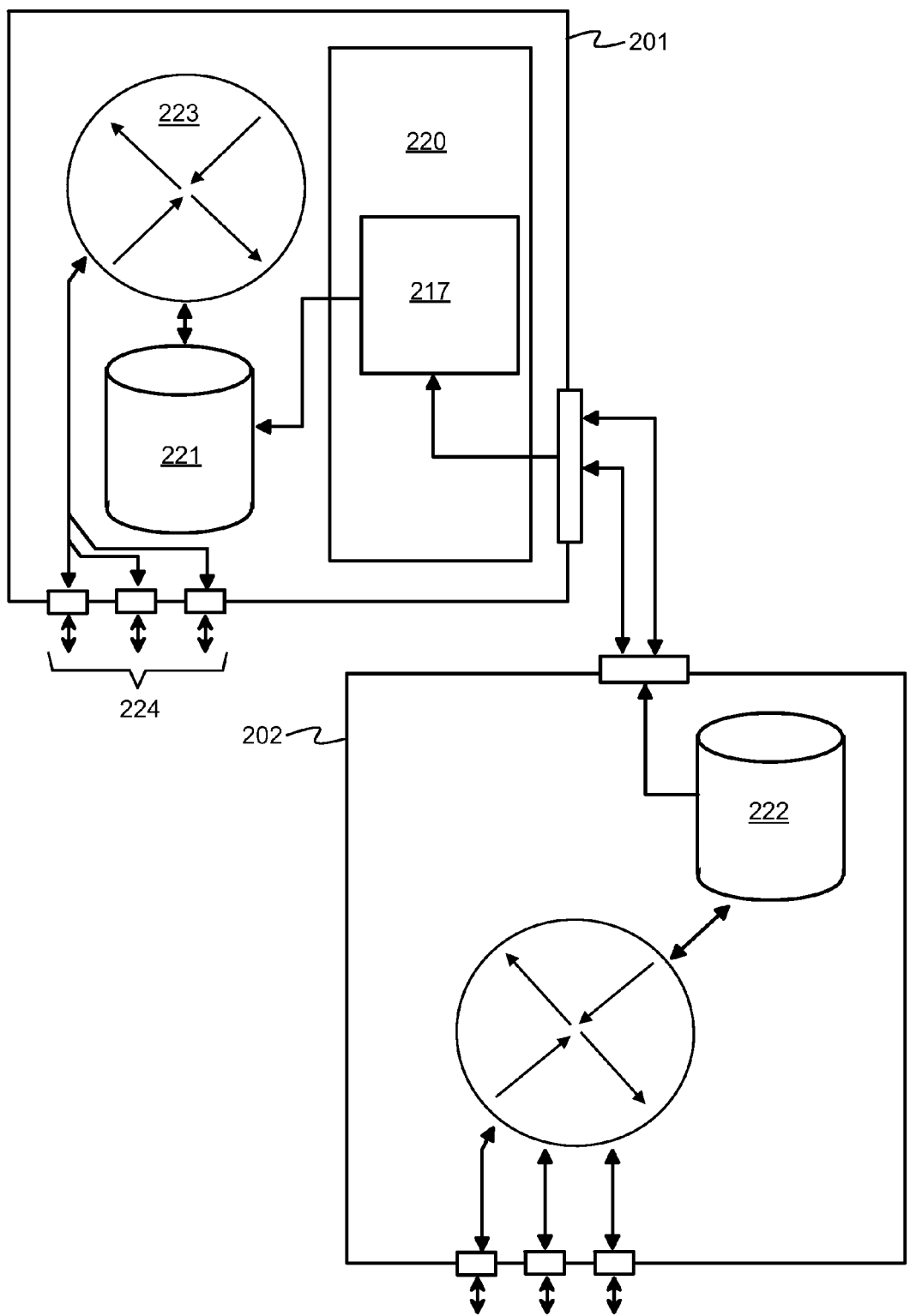
FIG. 2 shows a schematic illustration of a network element comprising a device according to an embodiment of the invention for providing network element protection.

FIG. 2 shows a schematic illustration of a device 220 according to an embodiment of the invention for providing network element protection. The device comprises a controller 217 arranged to update first configuration data stored in a configuration table 221 of a first network element 201 according to changes of second configuration data stored in a configuration table 222 of a second network element 202. The controller is arranged to carry out the updating as a response to a situation in which the second network element 202 operates according to the second configuration data as a part of a data transfer network and the first network element 201 constitutes a backup network element for the second network element, so as to keep the first network element capable of replacing the second network element in the data transfer network.

In a device according to an embodiment of the invention, the controller 217 is arranged to activate the first network element 201 to replace the second network element 202 as a response to reception of at least one of the following (i-iv): (i) an order to switch over from the second network element to the first network element, (ii) an indication of a failure in the second network element 202, (iii) an indication of a failure in a data transfer link to or from the second network element, (iv) an indication of failure in a monitoring data link between the first and second network elements.

In a device according to an embodiment of the invention, the controller 217 is arranged to write hardware specific data of the second network element 202 to the configuration table 221 of the first network element so as to enable the first network element to emulate the second network element in the data transfer network. The hardware specific data of the second network element may contain, for example, one or more Medium Access Control ("MAC") addresses related to the second network element.

In a device according to an embodiment of the invention, the controller 217 is arranged to control the first network element 201, after replacing the second network element 202, to advertise to network elements neighbouring the first network element in the data transfer network that the first network element has replaced the second network element in the data transfer network.

In a device according to an embodiment of the invention, the controller 217 is arranged to support the Internet Protocol ("IP") when updating the first configuration data according to changes of the second configuration data.

In a device according to an embodiment of the invention, the controller 217 is arranged to support the Multi Protocol Label Switching ("MPLS") when updating the first configuration data according to changes of the second configuration data.

The first network element 201 according to an embodiment of the invention for protecting the second network element 202 comprises:
  data transfer ports 224 for connecting to data transfer links of the data transfer network,
  a processing system 223 for supporting a data transfer protocol, e.g. Internet Protocol ("IP"), used in the data transfer network,
  the configuration table 221 for storing the configuration data needed for supporting the data transfer protocol, and
  the device 220 for updating the configuration data according to changes of configuration data of the second network element 202 as a response to a situation in which the first network element 201 is a backup network element for the second network element 202 and the second network element operates as a part of the data transfer network, so as to keep the first network element capable of replacing the second network element in the data transfer network.

In the first network element 201 according to an embodiment of the invention, the device 220 is arranged to write hardware specific data of the second network element to the configuration table 221 and the processing system 223 is arranged to control the first network element to emulate the second network element with the aid of the hardware specific data of the second network element after replacing the second network element.

In the first network element 201 according to another embodiment of the invention, the processing system 223 is arranger to control the first network element to advertise, after replacing the second network element, to network elements neighbouring the first network element in the data transfer network that the first network element has replaced the second network element in the data transfer network.

In the first network element 201 according to an embodiment of the invention, the processing system 223 is arranged to support at least one of the following: the Internet Protocol ("IP"), the Multi Protocol Label Switching ("MPLS").

Figure 3:
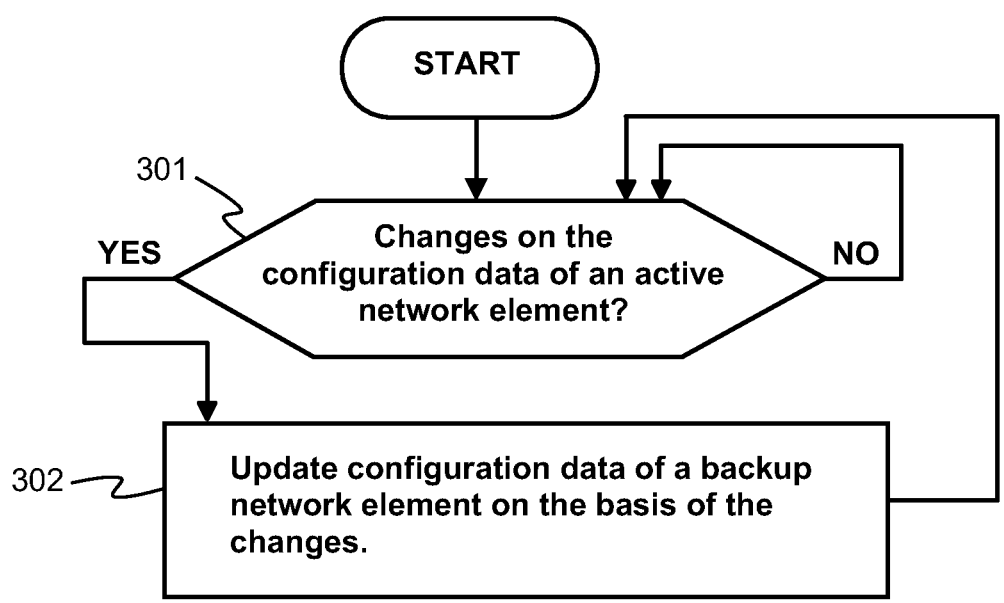
FIG. 3 shows a flow chart of a method according to an embodiment of the invention for providing network element protection.

FIG. 3 shows a flow chart of a method according to an embodiment of the invention for controlling a first network element of a data transfer network to protect a second network element of the data transfer network, the first network element comprising a first configuration table storing first configuration data and the second network element comprising a second configuration table storing second configuration data. The method comprises updating, phases 301 and 302, the first configuration data according to changes of the second configuration data when the second network element operates according to the second configuration data as an active network element in the data transfer network and the first network element constitutes a backup network element for the second network element.

A method according to an embodiment of the invention comprises activating the first network element to replace the second network element as a response to reception of at least one of the following (i-iv): (i) an order to switch over from the second network element to the first network element, (ii) an indication of a failure in the second network element, (iii) an indication of a failure in a data transfer link to or from the second network element, (iv) an indication of failure in a monitoring data link between the first and second network elements.

A method according to an embodiment of the invention comprises writing hardware specific data of the second network element to the configuration table of the first network element so as to enable the first network element to emulate the second network element in the data transfer network. The hardware specific data of the second network element may contain, for example, one or more Medium Access Control ("MAC") addresses related to the second network element.

A method according to an embodiment of the invention comprises controlling the first network element, after replacing the second network element, to advertise to network elements neighbouring the first network element in the data transfer network that the first network element has replaced the second network element in the data transfer network.

A method according to an embodiment of the invention comprises supporting the Internet Protocol ("IP") when updating the first configuration data according to changes of the second configuration data.

A method according to an embodiment of the invention comprises supporting the Multi Protocol Label Switching ("MPLS") when updating the first configuration data according to changes of the second configuration data.

A computer program according to an embodiment of the invention comprises software modules for controlling a first network element of a data transfer network to protect a second network element of the data transfer network, the first network element comprising a first configuration table storing first configuration data and the second network element comprising a second configuration table storing second configuration data. The software modules comprises computer executable instructions for controlling a programmable processor to update the first configuration data according to changes of the second configuration data as a response to a situation in which the second network element operates according to the second configuration data as a part of the data transfer network and the first network element constitutes a backup network element for the second network element, so as to keep the first network element capable of replacing the second network element in the data transfer network.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting. Therefore, the invention is not limited merely to the embodiments described above, many variants being possible.

What is claimed is:

1. A device comprising a controller hardware arranged to send update commands to a first network element so as to control the first network element to update first configuration data stored in a configuration table of the first network element according to changes of second configuration data stored in a configuration table of a second network element, wherein the controller hardware is arranged to send the update commands in response to a situation in which the changes are made to the second configuration data and the second network element operates according to the second configuration data as a part of a data transfer network and the first network element constitutes a backup network element for the second network element, so as to keep the first network element capable of replacing the second network element in the data transfer network, and wherein the update commands are arranged to control the first network element to write, prior to an event causing a need to activate the backup network element, hardware specific data of the second network element to the configuration table of the first network element so as to enable the first network element to emulate the second network element in the data transfer network.

2. A device according to claim 1, wherein the controller hardware is arranged to activate the first network element to replace the second network element as a response to reception of at least one of the following (i-iv): (i) an order to switch over from the second network element to the first network element, (ii) an indication of a failure in the second network element, (iii) an indication of a failure in a data transfer link to or from the second network element, (iv) an indication of failure in a monitoring data link between the first and second network elements.

3. A device according to claim 1, wherein the hardware specific data of the second network element contains one or more Medium Access Control addresses related to the second network element.

4. A device according to claim 1, wherein the controller hardware is arranged to control the first network element, after replacing the second network element, to advertise to network elements neighbouring the first network element in the data transfer network that the first network element has replaced the second network element in the data transfer network.

5. A device according to claim 1, wherein the device is arranged to support an Internet Protocol when updating the first configuration data according to changes of the second configuration data.

6. A device according to claim 1, wherein the device is arranged to support a Multi Protocol Label Switching when updating the first configuration data according to changes of the second configuration data.

7. A system for providing network element protection, the system comprising:
   a first network element comprising a first configuration table storing first configuration data,
   a second network element comprising a second configuration table storing second configuration data, and
   a controller arranged to send update commands to the first network element so as to control the first network element to update the first configuration data according to changes of the second configuration data,
   wherein the controller is arranged to send the update commands in response to a situation in which the changes are made to the second configuration data and the second network element operates according to the second configuration data as a part of a data transfer network and the first network element constitutes a backup network element for the second network element, so as to keep the first network element capable of replacing the second network element in the data transfer network, and
   wherein the update commands are arranged to control the first network element to write, prior to an event causing a need to activate the backup network element, hardware specific data of the second network element to the configuration table of the first network element, and the first network element is arranged to emulate the second network element with the aid of the hardware specific data of the second network element after replacing the second network element.

8. A system according to claim 7, wherein the first network element is arranged to replace the second network element as a response to at least one of the following (i-iii): (i) an order to switch over from the second network element to the first network element, (ii) a failure in the second network element, (iii) a failure in a data transfer link to or from the second network element.

9. A system according to claim 7, wherein the hardware specific data of the second network element contains one or more Medium Access Control addresses related to the second network element.

10. A system according to claim 7, wherein the first network element is arranged to advertise, after replacing the second network element, to network elements neighbouring the first network element in the data transfer network that the first network element has replaced the second network element in the data transfer network.

11. A system according to claim 7, wherein the first and second network elements are arranged to support an Internet Protocol.

12. A system according to claim 7, wherein the first and second network elements are arranged to support a Multi Protocol Label Switching.

13. A system according to claim 7, wherein the controller is a part of one of the following: the first network element, the second network element.

14. A system according to claim 7, wherein the system comprises one or more monitoring data links between the first and second network element, and the controller is arranged to activate the first network element as a response to a situation in which all of the one or more monitoring data links cease to work.

15. A system according to claim 7, wherein the system comprises a branched data transfer link, and the first network element is connected to a first branch of the branched data transfer link, the second network element is connected to a second branch of the branched data transfer link, and a third branch of the branched data transfer link is connected to a third network element of the data transfer network, the branched data transfer link being arranged to transfer data transmitted from the third network element to both the first and second network elements, data transmitted from the first network element to the third network element, and data transmitted from the second network element to the third network element.

16. A method for controlling a first network element of a data transfer network to protect a second network element of the data transfer network, the first network element comprising a first configuration table storing first configuration data and the second network element comprising a second configuration table storing second configuration data, the method comprising sending update commands to the first network element so as to control the first network element to update the first configuration data according to changes of the second configuration data, wherein the update commands are sent in response to a situation in which the changes are made to the second configuration data and the second network element operates according to the second configuration data as a part of the data transfer network and the first network element constitutes a backup network element for the second network element, so as to keep the first network element capable of replacing the second network element in the data transfer network, and wherein the update commands control the first network element to write, prior to an event causing a need to activate the backup network element, hardware specific data of the second network element to the configuration table of the first network element so as to enable the first network element to emulate the second network element in the data transfer network.

17. A method according to claim 16, wherein the method comprises activating the first network element to replace the second network element as a response to reception of at least one of the following (i-iv): (i) an order to switch over from the second network element to the first network element, (ii) an indication of a failure in the second network element, (iii) an indication of a failure in a data transfer link to or from the second network element, (iv) an indication of failure in a monitoring data link between the first and second network elements.

18. A method according to claim 16, wherein the hardware specific data of the second network element contains one or more Medium Access Control addresses related to the second network element.

19. A method according to claim 16, wherein the method comprises controlling the first network element, after replacing the second network element, to advertise to network elements neighbouring the first network element in the data transfer network that the first network element has replaced the second network element in the data transfer network.

20. A method according to claim 16, wherein the method comprises supporting an Internet Protocol when updating the first configuration data according to changes of the second configuration data.

21. A method according to claim 16, wherein the method comprises supporting a Multi Protocol Label Switching when updating the first configuration data according to changes of the second configuration data.

22. A non-transitory computer readable medium encoded with a computer program for controlling a first network element of a data transfer network to protect a second network element of the data transfer network, the first network element comprising a first configuration table storing first configuration data and the second network element comprising a second configuration table storing second configuration data, the computer program comprising computer executable instructions for controlling a programmable processor to:
send update commands to the first network element so as to control the first network element to update the first configuration data according to change of the second configuration data as a response to a situation in which the changes are made to the second configuration data and the second network element operates according to the second configuration data as a part of the data transfer network and the first network element constitutes a backup network element for the second network element, so as to keep the first network element capable of replacing the second network element in the data transfer network,
wherein the update commands control the first network element to write, prior to an event causing a need to activate the backup network element, hardware specific data of the second network element to the configuration table of the first network element so as to enable the first network element to emulate the second network element in the data transfer network.

* * * * *